United States Patent
Bardin et al.

(10) Patent No.: US 10,757,763 B2
(45) Date of Patent: Aug. 25, 2020

(54) METHOD FOR HEATING A FLUID CIRCUIT BY SUPPLYING ALTERNATING CURRENT TO A DIRECT-CURRENT PUMP MOTOR

(71) Applicant: AKWEL, Champfromier (FR)

(72) Inventors: Matthieu Bardin, Chatuzange le Goubet (FR); Regis Munoz, Saint Rambert d'Albon (FR)

(73) Assignee: AKWEL, Champfromier (FR)

( * ) Notice: Subject to any disclaimer, the term of this patent is extended or adjusted under 35 U.S.C. 154(b) by 566 days.

(21) Appl. No.: 15/496,116

(22) Filed: Apr. 25, 2017

(65) Prior Publication Data

US 2017/0311391 A1 Oct. 26, 2017

(30) Foreign Application Priority Data

Apr. 25, 2016 (FR) ...................................... 16 53632

(51) Int. Cl.
| | |
|---|---|
| H05B 6/02 | (2006.01) |
| H05B 6/04 | (2006.01) |
| H05B 6/06 | (2006.01) |
| H05B 6/10 | (2006.01) |
| H05B 3/78 | (2006.01) |

(Continued)

(52) U.S. Cl.
CPC .............. H05B 6/04 (2013.01); B60S 1/488 (2013.01); F01N 3/2066 (2013.01); F01P 3/20 (2013.01); F02M 31/125 (2013.01); F04D 29/584 (2013.01); F04D 29/588 (2013.01); H02P 29/62 (2016.02); *F01N 2610/02* (2013.01);

(Continued)

(58) Field of Classification Search
CPC .. H05B 3/02–08; H05B 3/78; H05B 2213/00; H05B 6/00–06; H05B 6/10; H05B 6/36
See application file for complete search history.

(56) References Cited

U.S. PATENT DOCUMENTS

| | | | |
|---|---|---|---|
| 9,877,359 B2* | 1/2018 | Duffield | .............. A01M 1/2061 |
| 2003/0029863 A1* | 2/2003 | Morrison | ................. H05B 6/04 |
| | | | 219/628 |

(Continued)

FOREIGN PATENT DOCUMENTS

| | | |
|---|---|---|
| DE | 10 2012 206822 A1 | 10/2013 |
| JP | 2005-94818 A | 4/2005 |
| WO | 2015/049713 A1 | 4/2015 |

*Primary Examiner* — Michael A LaFlame, Jr.
(74) *Attorney, Agent, or Firm* — Oliff PLC (57) ABSTRACT

A heating device intended to heat body, such as fluid contained in fluid circuit, the device including at least one electric heating element, as well as at least one control module to electrically power the heating element, the heating element being formed by propulsive winding circuit of direct-current electric motor which, when it is electrically powered by a direct supply voltage, generates drive force which tends to drive the motor in direction of displacement determined by the polarity of the supply voltage, and the control module including activation mode called heating oscillating mode, according to which the control module causes a warm-up of the propulsive winding circuit by Joule effect by applying at the terminals of the winding circuit an alternating supply voltage whose polarity switches, alternately and automatically, according to predetermined frequency called heating frequency, from a first polarity to opposite second polarity.

12 Claims, 2 Drawing Sheets

(51) Int. Cl.
  *F04D 29/58* (2006.01)
  *H02P 29/62* (2016.01)
  *B60S 1/48* (2006.01)
  *F01N 3/20* (2006.01)
  *F01P 3/20* (2006.01)
  *F02M 31/125* (2006.01)

(52) U.S. Cl.
  CPC .... *F01N 2610/10* (2013.01); *H05B 2206/024* (2013.01); *Y02T 10/126* (2013.01)

(56) References Cited

U.S. PATENT DOCUMENTS

| | | |
|---|---|---|
| 2012/0293102 A1 | 11/2012 | Kock et al. |
| 2014/0290833 A1* | 10/2014 | Rochette ................ B29C 33/06 156/110.1 |
| 2016/0233814 A1 | 8/2016 | Okamoto et al. |
| 2016/0255681 A1* | 9/2016 | Hadoulias ............. F24H 1/0018 219/629 |

* cited by examiner

METHOD FOR HEATING A FLUID CIRCUIT BY SUPPLYING ALTERNATING CURRENT TO A DIRECT-CURRENT PUMP MOTOR

The present invention concerns the heating devices intended to heat a body, such as a fluid or a mechanical part, in order to enable or improve the operation of a system that uses said body, in particular in the automotive field.

More particularly, the invention concerns a heating device associated to or integrated in an actuation system which uses a direct-current electric motor, such as for example a pumping system comprising a pump driven by an electric motor, as well as a method for piloting such a system.

More specifically, the present invention concerns the management of an electric motor intended to drive a pump equipping a fluid circuit which is likely to be exposed to temperatures sufficiently low to freeze the fluid contained in said circuit.

In particular, such an invention finds application in piloting pump motors which equip the fluid circuits, open or closed, on board vehicles, such as the urea circuits provided for the depollution of the exhaust gases, the cooling (in particular water-cooling) circuits, the windshield washer circuits intended to wash the glass surfaces of the passenger compartment or the headlights, the fuel supply circuits, etc.

It is known that, under certain circumstances, and in particular when a vehicle is parked in a particularly cold environment, as may be encountered for example during the winter period in a parking area that is barely sheltered or not sheltered at all, the temperature of the members of the vehicle may fall below the melting temperature of one or more of the fluids on board the vehicle, and thus cause a freezing (a solidification) of said fluid(s) in its/their respective circuits.

As example, the aqueous urea solutions (that is to say the water-urea mixtures, known in particular by the trade name <<AdBlue®>>), which are used to depollute the exhaust gases of the combustion engines by selective catalytic reduction (abbreviated by <<SCR>>) of the nitrogen oxides (<<NOx>>), generally have, at normal atmospheric pressure, a melting temperature, that is to say a temperature of transition between the liquid state and the solid state (and vice versa), in the range of $-11.5°$ C.

Of course, when the fluid is frozen, the fluid circuit is temporarily blocked and therefore cannot fulfills its normal function, which may be detrimental to the proper operation of the vehicle, and even to the safety of the vehicle, depending on the concerned circuit.

Hence, it is necessary to provide, within each concerned fluid circuit, a heating device comprising one or several heating element(s) which are capable of sufficiently heating said circuit in order to make the fluid return to its liquid state, and thus reestablish the normal operation of said circuit, as quickly as possible.

To this end, it is known in particular to integrate to the fluid circuit resistive heating elements operating by Joule effect, such as heating wires or cartridge heaters made of a PTC-type ceramic, that is to say <<Positive Temperature Coefficient>> ceramic. Advantageously, the electrical resistance of the PTC cartridges increases with temperature, thus allowing in practice a certain self-regulation of the heating.

Nonetheless, the addition of such heating elements, as well as the control modules and the cables necessary to electrically power said heating elements, increases the complexity, the weight, the bulk and the cost of the fluid circuits and therefore, more generally, of the vehicle.

Moreover, when the pump is blocked by the frozen fluid, there is a non-negligible risk of damaging and even destroying the motor and/or the pump if the drive motor of said pump is electrically powered, either inadvertently, or intentionally during an attempt to pressurize the fluid circuit or during an attempt to forcibly unblock the rotation of the pump.

Consequently, the objects assigned to the invention aim at overcoming the aforementioned drawbacks, and proposing a new system for managing a fluid circuit, compact and inexpensive, which allows heating the fluid effectively and rapidly when needed, while preserving the pump and its motor from any premature wear and from any accidental degradation.

The objects assigned to the invention are achieved by means of a heating device intended to heat a body, such as a fluid contained in a fluid circuit, said heating device comprising at least one electric heating element, as well as at least one control module arranged to electrically power said heating element so that said heating element produces heat intended for the body to heat, said device being characterized in that said heating element is formed by a propulsive winding circuit of a direct-current electric motor which, when it is electrically powered by an appropriate direct supply voltage, having a given polarity, generates a drive force which tends to drive the motor in a direction of displacement which is determined by the polarity of said supply voltage, and in that the control module comprises an activation mode called <<heating oscillating mode>>, according to which said control module causes the warm-up of the propulsive winding circuit by applying at the terminals of said winding circuit an alternating supply voltage the polarity of which switches, alternately and automatically, according to a predetermined frequency called <<heating frequency>>, from a first polarity to an opposite second polarity.

Advantageously, the alternating voltage is configured so as to cause a warm-up of the propulsive winding circuit, and therefore an internal warm-up of the electric motor via said propulsive winding circuit, while substantially avoiding actually setting the motor in motion in either direction of displacement.

Advantageously, the invention therefore allows using as a heating element, and more particularly as a resistive heating element producing heat by Joule Effect, a propulsive winding of a direct-current electric motor, and more particularly a rotor winding of said motor, normally intended to set said motor in movement, simply by powering said winding with an alternating supply voltage, the polarity of which is periodically inverted at the rate of the chosen heating frequency, rather than with a direct supply voltage.

To the extent that the concerned electric motor actually belongs to an actuation system, for example as a motor actuating a pump within a pumping system, the invention therefore allows using said motor, and more particularly the propulsive winding(s) thereof, according to two distinct functions: on the one hand a main drive function, when the winding is powered by a direct supply voltage which allows, in a conventional manner, driving the motor in displacement and, on the other hand, an auxiliary heating function, when this same winding is intentionally powered by an alternating supply voltage.

By applying an alternating supply voltage with a high frequency, higher than a frequency threshold which is defined according to the inertia of the motor, (electric) energy is advantageously brought to the motor, which will be dissipated in the form of heat within the winding and therefore within the motor, though without developing a significant mechanical power, that is to say without letting a significant motor torque arise within the electric motor, and in particular without causing the forced movement (typically rotation) of said electric motor.

Indeed, the rapid changes of polarity of the supply voltage have the effect of alternately biasing the motor very briefly in the first direction of displacement, and then very briefly in the opposite second direction of displacement, and so forth, according to a left/right/left/right/etc. type alternation or, in the case of a rotary motor, according to a clockwise/counterclockwise/clockwise/counterclockwise/etc. type alternation.

Because of this succession of close and repeated changes of the direction of activation of the motor, and because of the mechanical inertia of the electric motor, said motor is maintained permanently, that is to say as long as the alternating supply voltage is applied at the heating frequency, in a transitional regime, consistently oscillating between a first transitional regime leading to the first direction of displacement and a second transitional regime, opposite to the first transitional regime, leading to the second direction of displacement, without ever being able to reach a steady regime in either direction of displacement, and therefore without being able to reach neither a high motor torque (maximum admissible torque) nor the conditions of a real movement (typically a current corresponding to the starting current of said motor under the considered conditions).

For example, and in particular in the case of a blocked motor, the transitional regimes may be preferably interrupted by the alternation of polarity before that the torque exerted by the motor could reach a reference maximum admissible torque, which will be chosen for example to be equal to a predetermined fraction (for example 50%, 75%, 90% and even 95%) of the maximum torque which is delivered under the nominal direct voltage in the case of a blocked motor.

Similarly, in an alternative or complementary manner, the transitional regimes may be interrupted by the alternation of polarity before the magnitude of the electric current passing through the propulsive winding, called <<winding current>>, could reach a maximum admissible current, lower than a reference starting current from which the motor actually starts to be driven in displacement.

Thus, said maximum admissible current may be in particular chosen to be equal to a predetermined fraction (typically 50%, 75%, 90%, and even 95%) of said reference starting current.

For example, said reference starting current may correspond to the no-load starting current of the motor (considered separately from the actuation system), or to a reference load starting current measured empirically, at a chosen reference temperature, for example at the melting (or thawing) temperature of the concerned fluid which corresponds in practice to the unblocking limit of the motor, and while taking into account the load driven by the motor (that is to say the resistance opposed to the displacement of the motor by the mechanism driven by said motor, at the considered temperature).

In any case, the electric motor, thus urged according to a succession of opposite transitional regimes, therefore oscillates imperceptibly in the vicinity of a fixed position, and even possibly by being exactly in said fixed position, while still receiving the electric energy that is consumed by the propulsive winding circuit and dissipated in the form of heat.

Thus, it is possible to use the motor itself, and more particularly the propulsive winding already present within said motor, to heat the associated fluid circuit, and therefore to thaw the fluid, without the need to add any auxiliary heating element, and without the energizing of said propulsive winding according to the heating oscillating mode generating severe mechanical constraints on the motor or on the mechanism coupled to said motor, such as a pump rotor, when said mechanism is still trapped by said frozen fluid.

Hence, the invention allows combining the heating and drive functions within a same device, which is particularly simple, light, compact, and inexpensive.

In this respect, it will be noted that the heating oscillating mode proposed by the invention is particularly compatible with a brushed motor.

Hence, the invention enables the use, within the concerned device, of a brushed motor, which has the advantage of being a particularly inexpensive component.

Furthermore, the absence of rotation during the heating phase allows avoiding wearing of the members of said motor by friction, which preserves the service life of the motor.

Herein again, such an advantage is particularly appreciable when using a brushed electric motor, because the absence of rotation allows avoiding, during the heating phase, wearing of said brushes by friction at contact with the collector rings of the rotor which are connected to the propulsive windings mounted on said rotor.

Ultimately, the invention therefore allows achieving an effective and rapid heating, which is gentle to the motor and to the mechanical members constitutive of the fluid circuit.

Moreover, in a particularly advantageous manner, and as will be detailed hereinafter, the invention allows using one single switching circuit associated to the electric motor, such as for example an H-bridge, to selectively activate the propulsive winding circuit by means of an alternating voltage having an oscillating polarity, for heating, or by means of a direct voltage having a constant polarity intended to drive the motor, in a permanent regime, in a chosen direction of displacement.

Thus, it is possible to simplify the control module and achieve savings in electronic components.

Other objects, features and advantages of the invention will appear in more detail upon reading the following description, as well as with reference to the appended drawings, provided only for an illustrative and non-restrictive purpose, among which.

The present invention concerns a heating device 1, which is intended to heat a body 20, such as a fluid 20 contained in a fluid circuit 100, and more particularly to thaw such fluid 20 or prevent such fluid 20 from freezing.

To this end, said device 1 comprises at least one electric heating element 4, as well as at least one control module 10 which is arranged to electrically power said heating element 4 so that said heating element 4 produces heat intended for the body 20 to heat.

Figure 1:
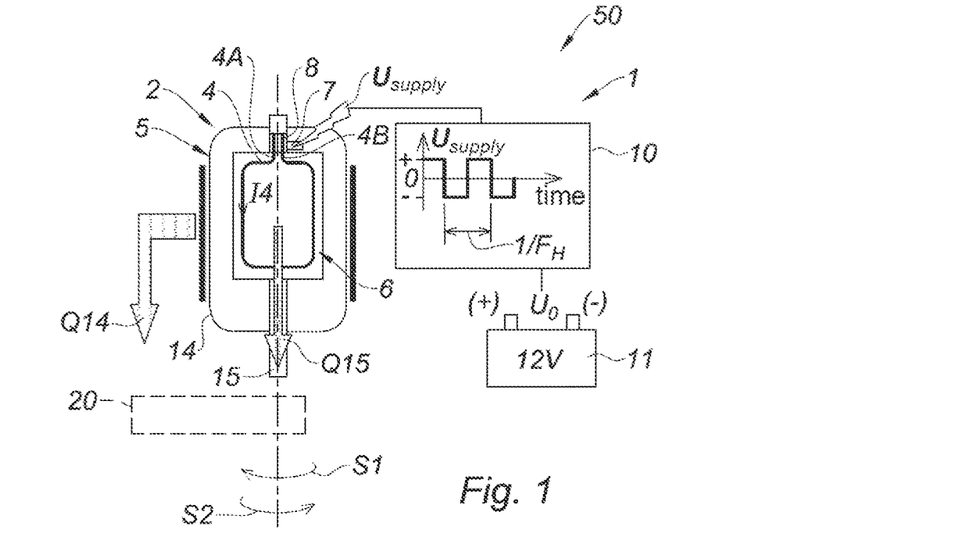
FIG. 1 illustrates, according to a schematic view, a heating device according to the invention.
Figures 3, 4:
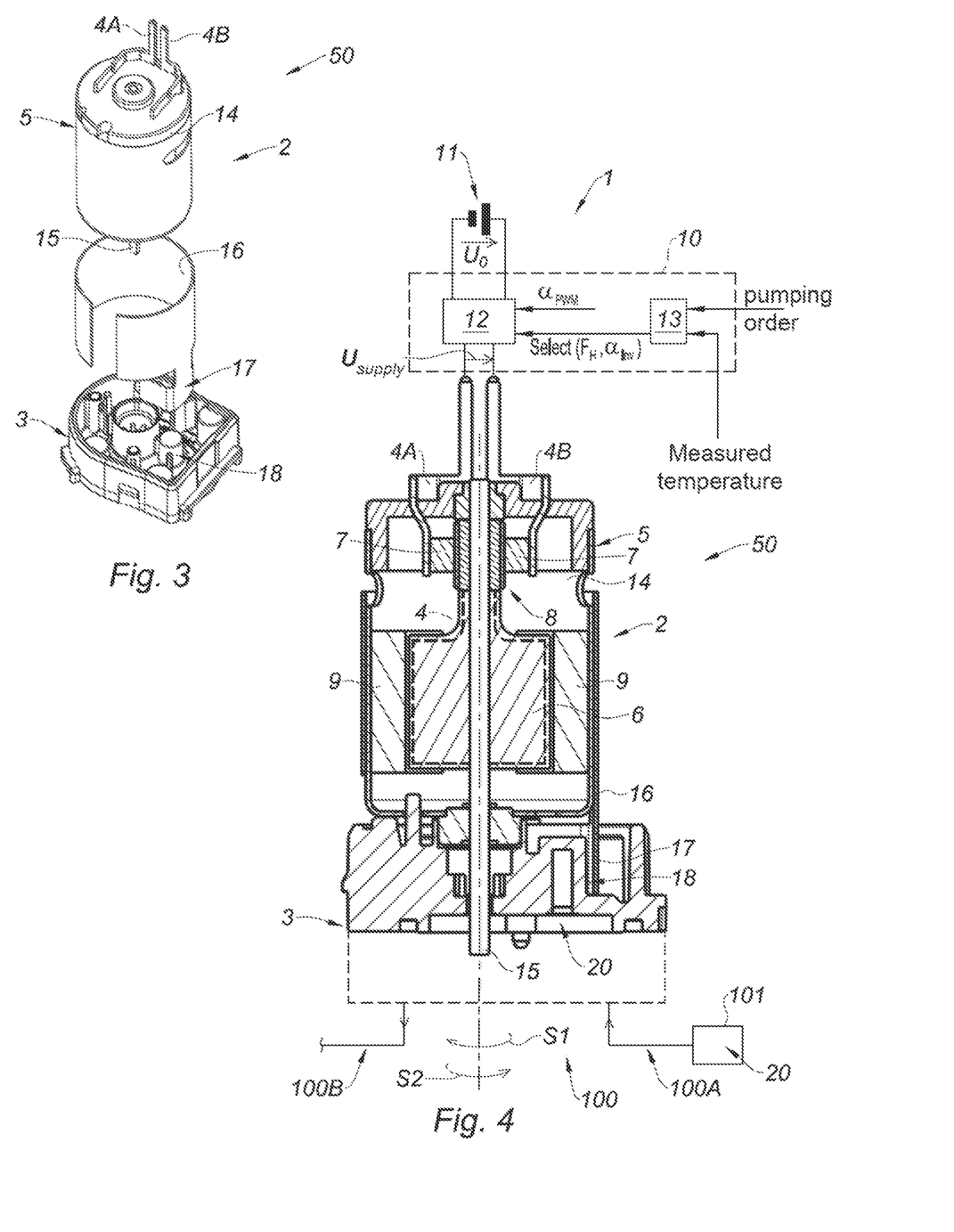
FIG. 3 illustrates, according to an exploded perspective view, an embodiment of a pumping system subassembly according to the invention, within which the motor is provided with a magnetic flux collecting envelope the arrangement of which has been modified so as to extend said envelope up to the pump body so that said envelope also acts as a collector and conveyor of heat which promotes the transfer of heat toward said pump body.
FIG. 4 illustrates, according to a longitudinal sectional view in a sectional plane containing the axis of the shaft of the motor, a pumping system using the subassembly of FIG. 3.

Preferably, the heating device 1 is part of an actuation system 50 which comprises a direct-current electric motor 2, as illustrated in FIGS. 1 and 4.

As will be detailed later on, said electric motor 2 advantageously forms a shared member, which may be used as a motor per se, for a main driving function, as well as a heating element for a heating function.

More specifically, in this respect, said heating element 4 is formed by a propulsive winding circuit 4 of the electric motor 2. Hence, for convenience, it is possible to assimilate the heating element and the winding circuit with each other, and assign the same reference numeral 4 to them in the following.

Preferably, as illustrated in FIG. 4, the actuation system 50 constitutes a pumping sub-assembly, within which the electric motor 2 is coupled to a mechanism 3 forming a pump (partially and schematically represented in said FIG. 4) so as to allow driving said pump in order to pump a fluid 20, herein within the aforementioned fluid circuit 100.

For convenience, the mechanism 3 may be assimilated with a pump 3 in the following.

That being so, the mechanism 3 driven by the motor 2 may be of a type other than a pump without departing from the scope of the invention.

The electric motor 1 may be formed by any direct-current motor, possibly linear, or preferably rotary.

Preferably, the electric motor will consist of a motor with a double direction of displacement S1, S2, and more particularly, a rotary motor with a double direction of rotation.

Figure 2:
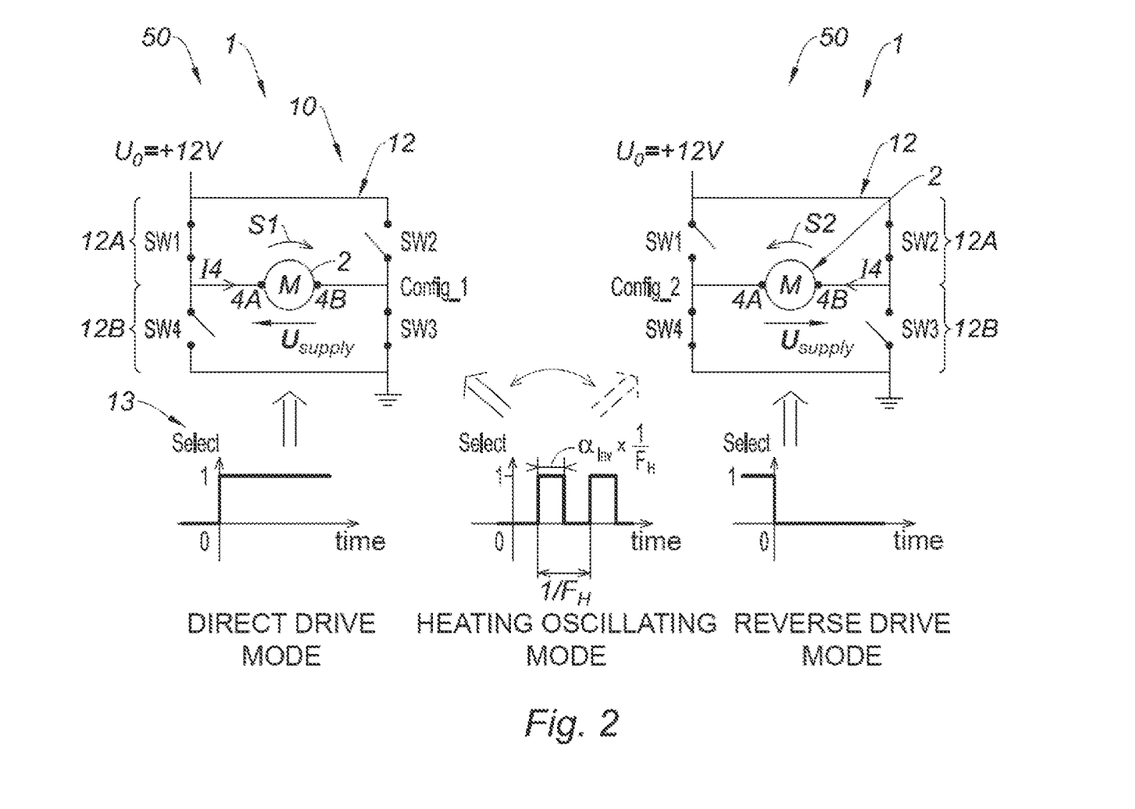
FIG. 2 illustrates, according to a schematic view, the operation of an H-bridge type switching circuit, allowing selectively activating the motor, in accordance with the invention, either by means of a direct voltage capable of setting said motor in movement in the desired direction of displacement, or by an alternating voltage capable of causing a warm-up of the propulsive winding without setting said motor in motion.

Thus, the motor 2 may act, and more particularly may be set in movement, for example in continuous rotation, either in a first direction of displacement S1, herein conventionally the clockwise direction S1 in FIG. 2, or in a second direction of displacement S2 opposite to the first direction of displacement S1, herein conventionally the counterclockwise direction S2 in FIG. 2.

Conventionally, within a pumping subassembly 50, as illustrated in FIG. 4, the first direction of displacement S1 may correspond to a direction called <<pumping>> direction, in which the pump 3 ensures the transfer and/or the pressurization of a fluid 20 from the upstream portion 100A of a fluid circuit 100, comprising for example a tank 101, toward the downstream portion 100B of said fluid circuit, whereas the second direction of displacement S2 may correspond to a direction called <<purging>> direction, in which the pump 3 ensures the return of the fluid 20 from the downstream portion 100B to the upstream portion 100A of the fluid circuit 100, and for example the return of said fluid into the tank 101, in order to purge the downstream portion 100B from the fluid circuit.

In addition, regardless of its arrangement, the direct-current electric motor 2 is provided, in a manner known per se, with at least one propulsive winding circuit 4 through which, when it is electrically powered by an appropriate direct supply voltage $U_{supply}$ having a given polarity, passes an electric current, called <<winding current>> I4, which allows said winding circuit 4 to generate a drive force which tends to drive the motor 2 in a direction of displacement S1, S2, said direction of displacement S1, S2 being determined by the direction of said winding current I4, itself determined by the polarity (that is to say the sign) of said supply voltage $U_{supply}$.

The device 1 also comprises a control module 10 which is in charge of piloting the electric motor 2, by applying to this end a supply voltage $U_{supply}$ at the terminals 4A, 4B of said at least one propulsive winding circuit 4 (which forms a dipole), in accordance with a predefined activation mode.

It will be noted that, within the meaning of the invention, the propulsive winding circuit 4 constitutes a winding circuit internal to the electric motor 2, which actively contributes, when powered, to setting the motor 2 in movement.

As such, the propulsive winding circuit 4 may possibly constitute a stator winding, of the field winding type, mounted on a fixed portion 5 of the motor 2, or <<stator>> 5, and serving to generate a fixed magnetic field within the motor 2.

In such a case, such a motor 2 would also comprise rotor winding circuits, mounted on a movable portion of the motor 2, or <<rotor>> 6, and arranged to be also powered by a direct current so as to generate, under the effect of the fixed magnetic field created by the stator winding circuit, a force tending to drive the rotor 6.

According to another possible implementation, the electric motor 2 may be provided with a stator 5 with permanent magnets 9, generating the fixed magnetic field, whereas the only propulsive winding circuits 4 will be located on a movable portion (rotor) 6 of said motor 2.

That being so, whether the fixed magnetic field of the motor 2 is generated by stator windings powered with current or on the contrary by permanent magnets 9, the propulsive winding circuit 4 used for the implementation of the invention will be, in a particularly preferred manner, a rotor winding circuit, of the armature winding type, which is mounted on a movable portion 6 of the motor 2, and more particularly on the rotor 6, which is placed in the fixed magnetic field of the motor, and through which, when powered by the supply voltage $U_{supply}$, passes an electric current (winding current I4) so as to generate a mechanical force (Laplace force) allowing movably driving said rotor 6 relative to the stator 5.

In practice, as illustrated in FIGS. 3 and 4, the terminals 4A, 4B of the propulsive winding circuit 4 correspond to the (fixed and apparent) terminals of the motor 2, formed for example by metal terminal pins, by which said motor 2 is electrically connected to a supply circuit.

In a particularly preferred manner, the direct-current electric motor 2 is a rotary motor with brushes 7, and more particularly a motor with brushes 7 which uses permanent magnets 9 to generate its stator magnetic field.

As has been stated hereinabove, the invention actually allows using such a motor 2 with brushes 7, which is advantageously inexpensive, selectively either as a drive element, in order to ensure a normal first motor function, or as a heating element, in order to ensure an additional second heating function, without any risk of degradation of said motor 2 with brushes or of the mechanism 3 coupled to the latter.

If a motor 2 with brushes 7 is used, then the propulsive winding circuit 4 to which the control module 10 applies the supply voltage $U_{supply}$ will be preferably a rotor winding of said motor 2, powered via said brushes 7.

In a manner known per se, and as illustrated in FIG. 4, such a rotor winding circuit 4, that is to say carried by the rotor 6, will be connected to a rotating collector 8, also carried by the rotor 6, whereas the brushes 7 (also called <<carbon brushes>>), that is to say the conductive pads preferably constituted by graphite or metal, mounted on the stator 5 and connected to the terminals 4A, 4B of the propulsive winding circuit 4, will have a rubbing contact with said collector 8, so as to ensure, when the motor is rotating, a periodical permutation of the polarity of the supply voltage $U_{supply}$ applied to the concerned winding circuit 4, depending on the angular position of the rotor 6 with respect to the stator 5.

Preferably, the control module 10 comprises at least one first activation mode, called <<direct drive mode>>, according to which the control module 10 applies to the motor 2 a direct supply voltage $U_{supply}$ having a first constant polarity, herein conventionally positive, so as to set said motor 2 in movement in a first direction of displacement S1 (said supply voltage creating indeed a winding current I4 which circulates in a first direction, defined by the polarity of said voltage).

Preferably, the control module 10 also comprises a second activation mode, called <<reverse drive mode>>, according to which the control module 10 applies to the motor a direct supply voltage $U_{supply}$ having a second constant polarity, herein conventionally negative, having a sign opposite to the first polarity, so as to set said motor in movement in a second direction of displacement S2 opposite to the first direction of displacement S1 (said supply voltage creating indeed a winding current I4 which circulates in a second direction, opposite to the first one).

<<Direct supply voltage>> indicates, in contrast to an alternating voltage whose polarity (the sign) is periodically inverted, that the supply voltage $U_{supply}$ (and consequently the resulting winding current I4) then has a polarity (a sign) constant, continuously positive or on the contrary continuously negative, a polarity that said supply voltage (and therefore the resulting winding current I4) preserves over the entire duration of activation during which the motor 2 is energized in accordance with the selected activation mode (drive mode).

Advantageously, the average value (average amplitude) of the supply voltage $U_{supply}$, that is to say the effective value of said supply voltage, may be adjusted, while preserving the chosen polarity, so as to adapt said supply voltage to the electric power which will be necessary and sufficient to set (and maintain) the motor 2 in movement in the considered direction of displacement S1, S2, that is to say more particularly to set (and maintain) the rotor 6 in rotation relative to the stator 5, depending on the load opposed by the mechanism 3 driven by the motor 2.

Advantageously, the adjustment of the average value of the supply voltage $U_{supply}$ may be achieved by means of a chopper (or <<PWM>> for <<Pulse Width Modulation>>) whose duty-cycle, called <<chopping duty-cycle>> $\alpha_{PWM}$, that is comprised and adjustable between 0% and 100%, will allow setting said average value of the supply voltage in proportion to a nominal voltage $U_0$ with a constant value (typically 12 V), supplied by a voltage source 11, such as a vehicle battery.

The switching from the first activation mode to the second activation mode, that is to say the switching from the direct drive mode in the first direction of displacement S1 to the reverse drive mode in the second direction of displacement S2, may be performed for example by reversing the polarity of the nominal voltage $U_0$ so as to make said nominal voltage, and therefore the average value of the supply voltage $U_{supply}$, switch from a strictly positive first polarity to a strictly negative second polarity.

For example, this inversion of polarity may be achieved by permuting the direction of connection of the voltage source 11 at the terminals 4A, 4B of the propulsive winding circuit 4, by means of a switching circuit 12 such as an H-bridge, as illustrated in FIG. 2, and as will be described in more detail hereinafter.

According to the invention, and as illustrated in FIG. 1 and mentioned hereinabove, the heating element 4 is formed by a propulsive winding circuit 4 of the direct-current electric motor 2.

Advantageously, the control module 10 then comprises an activation mode called <<heating oscillating mode>>, according to which said control module 10 causes a warm-up of the propulsive winding circuit 4 by applying at the terminals 4A, 4B of said winding circuit 4 an alternating supply voltage $U_{supply}$ whose polarity switches, alternately and automatically, according to a predetermined frequency called <<heating frequency>> $F_H$, from a first polarity to an opposite second polarity.

Thus, the control module 10 comprises, preferably in addition to the aforementioned first and second activation modes, an activation mode called <<heating oscillating mode>>, according to which said control module 10 energizes the at least one propulsive winding circuit 4 according to a succession of opposite transitional regimes, by means of an alternating (non-zero) supply voltage $U_{supply}$ whose polarity alternately switches, according to a predetermined frequency called <<heating frequency>> $F_H$, from a first polarity to an opposite second polarity, so as to cause an internal warm-up of the electric motor 2 via said at least one propulsive winding circuit 4, while substantially avoiding an actual moving of the motor 2 in either direction of displacement S1, S2.

Preferably, the control module 10 is arranged to selectively adopt an activation mode among a plurality of available activation modes comprising, on the one hand, the heating oscillating mode, according to which said control module 10 applies at the terminals 4A, 4B of the propulsive winding circuit 4 an alternating supply voltage $U_{supply}$, at the heating frequency $F_H$ and, on the other hand, at least one other activation mode, called <<drive mode>>, according to which said control module 10 applies at the terminals 4A, 4B of the propulsive winding circuit 4 a direct supply voltage $U_{supply}$ having a constant polarity, so as to drive the motor 2 in a direction of displacement S1, S2 corresponding to said polarity.

Hence, a same direct-current motor 2, and more particularly a same winding circuit 4 of said motor 2 (or a same set of winding circuits 4 of said motor), and a same control module 10 may be shared so as to use said motor sometimes as a drive member, sometimes as a heating member.

Such a resource sharing advantageously allows realizing a more economical and compact system 50.

Preferably, the heating oscillating mode constitutes more particularly a third activation mode made available to the control module 10, so that the control module 10 could selectively adopt an activation mode among a plurality of available activation modes including: the direct drive mode, the reverse drive mode, and said heating oscillating mode.

Preferably, the activation of the heating oscillating mode may be achieved by making the control module 10 switch alternately from the first activation mode (direct drive) to the second activation mode (reverse drive) and vice versa, at the chosen rate of the heating frequency $F_H$, so that said control module 10 applies in turns, within a short time interval, first a (non-zero) supply voltage $U_{supply}$ with a first polarity temporarily biasing the motor 2 in the first direction of displacement S1 (typically over a half-period $1/(2F_H)$ characteristic of the heating frequency) and then a (non-zero) supply voltage $U_{supply}$ with an opposite second polarity temporarily biasing the motor 2 in the second direction of displacement S2 (typically over a half-period characteristic of the heating frequency).

Each of the alternations (positive alternation, and then negative alternation) of the alternating supply voltage $U_{supply}$ used by the heating oscillating mode, and more particularly each of the first and second activation modes activated one at a time according to this heating oscillating mode, is interrupted and replaced by the next alteration (respectively by the other activation mode) well before being able to establish a permanent regime, so that the motor 2, because of its inertia, has no time to be placed in a moving condition, neither in one direction of displacement S1, nor in the other S2, but remains in a transitional regime between the two directions of displacement S1, S2.

Nonetheless, the motor 2 still receives energy, brought by the alternating electric current passing therethrough, which energy is consumed by the motor 2, and more particularly by the propulsive winding 4, (mostly and even exclusively) in the form of heat.

The heating oscillating mode, advantageously maintained over a duration (very) greater than the period $1/F_H$ of the alternating supply voltage $U_{supply}$, therefore allows causing an internal warm-up of the motor 2 via the propulsive winding circuit 4 thus powered, while avoiding setting said motor 2 in movement.

Preferably, the conversion of the electric energy into heat (or, when reasoning per time unit, the conversion of the electric power into a heat flow) brought to the winding circuit 4 by the application of the alternating supply voltage $U_{supply}$ is achieved by Joule effect, using the resistive properties of the different constitutive elements of the winding circuit 4 (and belonging to the motor 2).

Thus, in the case of a motor 2 with brushes, it is possible to cause a warm-up of the powered rotor winding as such, but also of the brushes 7 and of the collector portion 8 by which the electric current, which results from the application of the supply voltage $U_{supply}$ at the terminals 4A, 4B of the winding circuit 4, is conveyed to reach and pass through said rotor winding.

Furthermore, it will be noted that the heating oscillating mode is advantageously available at any moment, regardless of the position in which the motor is located (and more particularly regardless of the angular position of the shaft of the motor), because there is always at least one propulsive winding circuit 4 in electrical contact with the terminals 4A 4B.

Moreover, since an object of the invention is to heat the motor 2 by means of its internal members, namely by means of one or more of the propulsive winding circuits 4 which are already present by construction for ensuring the drive function of said motor 2, without adding auxiliary heating elements, we of course seek to allocate a sufficient amount of electrical energy to the concerned propulsive winding circuit(s) 4.

This is why we will manage to ensure that, during the activation according to the heating oscillating mode, a sufficient portion, preferably a major portion, and even the entirety, of the electric power (and therefore the electric energy) which is brought because of the application of the supply voltage $U_{supply}$ is directed toward the concerned propulsive winding circuit(s) 4.

Preferably, we will manage to ensure that, when the heating oscillating mode is activated, only the propulsive winding circuit 4, or if appropriate the propulsive winding circuits 4, forming an integral part of the motor, will be connected between the terminals 4A, 4B, with the exclusion of other electrical circuits, and in particular with the exclusion of other electrical circuits external to the motor, so that the electric power brought between these terminals 4A, 4B will be entirely (at 100%) injected in said propulsive winding circuit(s) 4.

If, in contrast, for construction reasons, other electrical circuits, in particular electrical circuits external to the motor, are connected to said terminals 4A, 4B, in addition to the propulsive winding circuit(s) 4, all said circuits will be intentionally arranged so that a sufficient electric current could pass through the winding circuits 4 to cause a satisfactory warm-up.

Thus, for example, if the terminals 4A, 4B form nodes at which the electric current could be distributed between, on the one hand, one or several propulsive winding circuit(s) 4 and, on the other hand, one or several other external circuit(s), wherein such an external circuit may for example correspond to a solenoid-valve located remotely from the pump 3 on the fluid circuit 100, we would manage to ensure, using switching members or appropriate filters, that at least 10%, at least 20%, and even at least 50% (that is to say the majority) of the electric current (and therefore of the energy) passing by these nodes is directed toward, and passes through, the propulsive winding circuit(s) 4.

In practice, when using the heating oscillating mode, the device 1 must comply cumulatively (and therefore simultaneously) with several conditions.

As has been said hereinabove, the first condition consists of not setting the electric motor 2 in movement, in order to concretely allow heating said motor 2 without making it rotate.

The second condition consists in bringing and dissipating enough thermal energy in the winding circuit 4 in order to obtain an effective warm-up, sufficient to ensure the thawing of the fluid circuit.

The third condition consists in avoiding an overheating of said winding circuit 4, in order not to degrade the motor 2 (in particular the very thin insulating sheaths which surround the wires constitutive of the winding). Typically, we will manage to avoid that the winding circuit 4 reaches or exceeds a predetermined critical temperature, for example fixed at 165° C.

In particular, the aforementioned first condition imposes that, when the motor 2 is not blocked, because the fluid 20 is not frozen, the peak magnitude I4_peak of the winding current I4 remains (permanently, during the entire duration of activation of the heating oscillating mode) lower than a maximum admissible value (upper threshold) I4_peak_max_cond1 that is lower than the reference starting current I_start which would cause starting of the motor 2.

As indicated hereinabove, to this end, it may be possible for example to measure, through tests, the starting current in a reference situation defined for a chosen reference temperature (for example the melting temperature of the fluid 20, which therefore corresponds to the release threshold of the rotor 6), and for a determined load (that is to say for a given mechanical resistance, either under no-load or by taking into account the driving of a given mechanism 3 at the considered temperature), and then to define the maximum admissible value as a fraction (typically 50%, 75%, 90%, and even 95%) of the reference starting current, so that the first condition would impose: I4_peak≤I4_peak_max_cond1<I_start.

In order to meet this first condition, that is to say to limit the peak magnitude I4_peak of the alternating winding current, it may be possible to adjust the average supply voltage $U_{supply}$, by adjusting the chopping duty-cycle $\alpha_{PWM}$.

Nonetheless, for convenience, we will preferably use, for a given supply voltage, a heating frequency $F_H$ which would be selected so that said heating frequency allows maintaining the peak magnitude I4_peak below the maximum admissible value I4_peak_max_cond1.

As such, the chosen heating frequency $F_H$ should be sufficiently high, with respect to the inertia of the motor 2, in order to avoid the effective moving of said motor 2, both in the first direction of displacement S1 and in the second direction of displacement S2, and more generally in order to avoid establishing a permanent drive regime that would tend to force the moving of said motor 2.

In order to meet the second condition, namely providing enough energy to the winding circuit 4 and dissipating enough energy (by Joule effect) in said winding circuit 4 in order to heat the motor 2 and the body 20, and more generally the associated fluid circuit 100, the root mean square (RMS) value I4_eff of the winding current I4 must be higher than or equal to a predetermined minimum RMS value (lower threshold) I4_eff_min.

Consequently, the peak magnitude I4_peak must in particular be higher than or equal to a predetermined minimum value (lower threshold) I4_peak_min (also noted I4_peak_min_cond2 when it refers to the second condition).

In order to meet this second condition, and provide a sufficiently high RMS current I4_eff to the winding circuit 4, the heating frequency $F_H$ must also be sufficiently low, considering in particular the given supply voltage $U_{supply}$, in order to leave time to the winding current I4 to reach, at each alternation, a sufficiently high maximum value (peak value I4_peak), and in particular a peak value I4_peak that is higher than the desired minimum value I4_peak_min.

Conversely, if the heating frequency was too high, the energy dissipated in the form of heat in the winding circuit 4 would be reduced, and even insufficient to achieve the desired warm-up.

In order to meet the third condition, that is to say to preserve the winding circuit 4 from a damaging overheating, we will ensure that the RMS value I4_eff of the winding current remains lower than or equal to a predetermined maximum admissible value (upper threshold) I4_eff_max.

Herein again, as for the first condition, we must in particular ensure, if appropriate, that the peak magnitude I4_peak does not exceed a maximum admissible value (upper threshold) I4_peak_max_cond3: I4_peak≤I4_peak_max_cond3.

To this end, and depending on the value of the supply voltage that is available at the terminals 4A, 4B of the winding circuit, it may be necessary to choose a heating frequency $F_H$ that is sufficiently high, in order to interrupt the rise of the winding current I4 at each alternation before said winding current could reach said maximum admissible value I4_peak_max_cond3.

Moreover, it will be noted that, in practice, the maximum admissible value associated to the third condition, noted I4_peak_max_cond3, will be generally lower, that is to say more constraining, than the maximum admissible value dictated by the first condition and noted I4_peak_max_cond1.

This is why we will ultimately choose as a maximum admissible limit of the peak current I4_peak the lowest (and therefore the more constraining) of these values:

I4_peak_max=MIN(I4_peak_max_cond1; I4_peak_max_cond3)

Consequently, we will choose a heating frequency $F_H$ that is higher than or equal to the highest of the corresponding minimum heating frequencies, which are respectively dictated by the first condition and by the third condition.

Considering the different constraints imposed by the aforementioned first and third conditions, the heating frequency $F_H$ will be preferably higher than or equal to 50 Hz, 500 Hz, and more preferably higher than or equal to 1 kHz, and even 2 kHz.

Moreover, taking into account the second condition, the heating frequency $F_H$ will also preferably be lower than or equal to 100 kHz, 50 kHz, and even 30 kHz.

The most adapted heating frequency will depend in particular on the electromagnetic characteristics of the winding circuit 4 as well as on the mechanical characteristics of the motor 2 and may be determined for example through tests.

Ultimately, according to a preferred feature which may constitute an invention on its own, applicable to any device aiming to heat a direct-current motor 2 by applying an alternating supply voltage $U_{supply}$ to a propulsive winding circuit 4 of said motor normally intended to receive a direct supply voltage $U_{supply}$, we will choose a heating frequency $F_H$ comprised between 50 Hz and 100 kHz, more preferably comprised between 2 kHz and 30 kHz, and in a particularly preferred manner substantially equal (for example by +/−10% or +/−5%) to 8 kHz.

As illustrated in FIGS. 2 and 3, the control module comprises a switching circuit 12 intended to connect the terminals 4A, 4B of the propulsive winding circuit 4 to a voltage source 11, preferably a direct voltage source 11, such as a battery (typically a vehicle battery, herein a 12 V battery in FIGS. 1 and 2).

According to a preferred feature which may constitute an invention on its own, applicable in particular to any device or system comprising a control module 10 in charge of piloting a direct-current electric motor 2, the switching circuit 12 is arranged to allow selectively adopting, on the one hand, a first connection configuration Config_1 (represented on the left part of FIG. 2), in which said switching circuit 12 ensures (as long as it remains in said first connection configuration) the application at the terminals 4A, 4B of the propulsive winding circuit 4 of a direct supply voltage $U_{supply}$ having a first constant polarity, in accordance with a first activation mode called <<direct drive mode>> which allows driving the motor 2 in a first direction of displacement S1 and, on the other hand, a second connection configuration Config_2 (represented on the right part of FIG. 2), in which this same switching circuit 12 ensures (as long as it remains in said second connection configuration) the application at the terminals 4A, 4B of the propulsive winding circuit 4 of a direct supply voltage $U_{supply}$ having a second constant polarity, inverted with respect to the first polarity, in accordance with a second activation mode called <<reverse drive mode>> which allows driving the motor 2 in a second direction of displacement S2 opposite to the first direction of displacement S1, whereas, in order to implement the third activation mode, called <<heating oscillating mode>>, said switching circuit 12 alternately switches, at the predetermined heating frequency $F_H$, from its first connection configuration Config_1 to its second connection configuration Config_2 and vice versa (as illustrated at the center of FIG. 2).

In other words, the invention advantageously allows selectively implementing three distinct activation modes using one single switching circuit 12, without any additional switcher or any additional oscillator, simply by changing, depending on the desired activation mode, the switching law which defines the appropriate connection configuration Config_1, Config_2, or the appropriate alternation of connection configurations, each of said connection configurations being associated to (and defining) a distinct polarity.

Thus, the invention allows saving switching elements (relays, transistors, etc.) and electrical cables, and consequently improves the reliability, the manufacturing cost as well as the compactness of the device 1.

It will be noted that the supply voltage $U_{supply}$, in particular when it consists of an alternating voltage, preferably forms a substantially square voltage, which may be advantageously obtained by toggling the polarity of the same nominal voltage $U_0$ by the aforementioned switching process.

In a particularly preferred manner, and as illustrated in FIG. 2, the switching circuit 12 may be formed by an H-bridge, preferably connected to a direct voltage source 11.

In a manner known per se, such an H-bridge (herein with four switches) comprises, on the one hand, an upstream switching stage 12A which includes first and second switches SW1, SW2, placed between the first pole (herein the positive pole) of the voltage source 11 and, respectively, the first terminal 4A and the second terminal 4B of the propulsive winding circuit 4 and, on the other hand, a downstream switching stage 12B, which includes third and fourth switches SW3, SW4, placed between the second pole (herein the negative pole) of the voltage source 11 and, respectively, the second terminal 4B and the first terminal 4A of the propulsive winding circuit 4.

Each of the switches SW1, SW2, SW3, SW4 may be formed by any appropriate electronic or electromechanical switching member, automatically pilotable, such as a relay, or a transistor, for example a MOSFET-type transistor.

In the first connection configuration Config_1, the first and third switches SW1, SW3 will be closed (on) whereas the second and fourth switches SW2, SW4 will be open (off).

Conversely, in the second connection configuration Config_2, the first and third switches SW1, SW3 will be open (off) whereas the second and fourth switches SW2, SW4 are closed (on).

It will be noted that, advantageously, such an H-bridge can ensure not only the selection of the polarity (the selection of the sign) of the supply voltage $U_{supply}$, by choosing and maintaining the corresponding connection configuration, but also, once this connection configuration is chosen, the chopping of the nominal voltage $U_0$, so as to set the average value of the supply voltage $U_{supply}$.

Indeed, in each connection configuration, it is possible to actuate, according to a chosen chopping duty-cycle $\alpha_{PWM}$, either one of the switches intended to be closed in said connection configuration, for example the switch of the downstream switching stage (SW3 in the first configuration, respectively SW4 in the second configuration), so that said switch SW3, respectively SW4, is alternately open and then closed, while the corresponding switch located in the other switching stage (herein the switch SW1 of the upstream switching stage, in the first connection configuration, respectively SW2 in the second connection configuration) remains closed.

It will be noted that, if the heating oscillating mode is activated, that is to say if the first and second connection configurations are alternated at the rate of the heating frequency $F_H$, and if it is desired to simultaneously chop the supply voltage $U_{supply}$ in order to modify the average value thereof, then it should be applied, to the switch SW3, respectively SW4, of the concerned stage, a chopping frequency at least twice as high as said heating frequency $F_H$, in order that the chopping remains effective, that is to say, in other words, the opening/closure cycle that controls individually said switch SW3, SW4 for chopping should be at least twice as short as the joint toggle cycle of the pairs of switches SW1, SW3, respectively SW2, SW4 according to which the permutation between the first connection configuration Config_1 and the second connection configuration Config_2 is performed in view of obtaining heating (it will be noted that there is herein an analogy with Shannon's sampling theorem).

According to another possible implementation, the average value of the supply voltage $U_{supply}$ may be adjusted upstream of the H-bridge, by a distinct chopper, and the H-bridge will be then dedicated exclusively to the selection of the connection configuration.

In any case, whether the H-bridge is used exclusively to manage the connection configuration or to concomitantly manage the connection configuration and the chopping of the supply voltage, the use of an H-bridge advantageously guarantees the simplicity and the reliability of the switching circuit 12.

Preferably, as can be seen in FIGS. 2 and 4, the control module 10 comprises a selector (or <<pilot>>) 13 which selects the activation mode according to which the winding circuit 4 is energized by said control module 10.

More particularly, the selector 13 selects to this end the connection configuration Config_1, Config_2 of the switching circuit 12 according to the value assumed by a binary input signal, called <<selection signal>> Select, which may selectively assume a first value (typically the value 1) associated to the first connection configuration Config_1, and therefore to the first direction of displacement S1 of the motor 2, or a second value (typically the value 0) distinct from the first value and associated to the second connection configuration Config_2, and therefore to the second direction of displacement S2.

In practice, the selection signal Select corresponds to the logic input <<direction of rotation>> present on the H-bridge switching circuit 12.

Advantageously, the direct drive mode will be activated by placing the selection signal Select at its first value (and preferably by continuously maintaining said selection signal at said first value, over the entire duration during which it is desired to apply said direct drive mode): Select=1, whereas the reverse drive mode will be activated by placing the selection signal Select at its second value (and preferably by continuously maintaining said selection signal at said second value, over the entire duration during which it is desired to apply said reverse drive mode): Select=0.

According to a preferred feature which may constitute an invention on its own, applicable to any switching circuit 12 managing the power supply of a direct-current electric motor 2, the heating oscillating mode is activated using an alternating selection signal Select, which periodically alternates, in accordance with the chosen heating frequency $F_H$, between the first value (one) and the second value (zero) and vice versa.

Herein, the activation of the heating oscillating mode will therefore be achieved by piloting the selector 13 by means of a selection signal Select which alternately toggles between 1 and 0, according to a periodic square signal the frequency of which corresponds to the heating frequency $F_H$.

Advantageously, the invention allows using the logic input <<direction of rotation>> of the switching circuit 12, normally intended to define the desired direction of rotation of the motor 2, as a selector 13, and more particularly as a polarity inverter in order to apply to the propulsive winding circuit 4 an alternating heating voltage, instead of a direct motor voltage.

The alternating selection signal Select used to trigger the heating oscillating mode may be obtained for example by chopping a direct voltage (the nominal value of which will correspond to the threshold value of the logic input, for example 5 V), over a cycle duration equal to the period $1/F_H$ which corresponds to the targeted heating frequency $F_H$.

The duty-cycle used to generate said selection signal Select, called <<inversion duty-cycle>> $\alpha_{inv}$, will be preferably equal to 50%, so that, during a cycle, the hold time of first connection configuration Config_1 (and therefore of the direct drive mode) will be substantially equal to the hold time of the second connection configuration Config_2 (and therefore of the reverse drive mode).

Thus, the positive and then negative alternations of the alternating supply voltage $U_{supply}$ will have substantially equal, and even exactly equal, durations.

Thus, in the heating oscillating mode, the motor 2 will be biased in a balanced manner in each of the directions of displacement S1, S2, thus avoiding any general movement of the motor 2 in either one of said directions of displacement S1, S2.

That being so, in absolute terms, and according to a feature which may constitute an invention on its own, it may be possible to consider modifying the inversion duty-cycle $\alpha_{inv}$ that defines the selection signal Select, so as to give preponderance, when the heating oscillating mode is activated, to a biasing of the motor 2 in a chosen direction of displacement S1, S2, relative to the opposite biasing in the other direction S2, S1, while preserving an alternation of the two types of biasing (via the alternation of the polarities).

As example, in FIG. 2, it is possible to fix an inversion duty-cycle $\alpha_{inv}$ strictly higher than 50% (that is to say strictly comprised between 50% and 100%) so as to promote the first direction of displacement S1, or on the contrary strictly lower than 50%, that is to say strictly comprised between 0% and 50%, so as to promote the second direction of displacement S2.

For example, such a control may be used to make the motor "drift", that is to say to generally perform a slow and progressive displacement, in the direction of displacement S1, S2 to which preponderance is given.

In particular, such a control may be used as a (fourth) transition mode, when the fluid 20 begins to thaw and progressively release the pump 3 and the fluid circuit 100, in order to ensure a smooth transition between the "pure" heating oscillating mode, in which the motor 2 is immobile, and a normal (direct or, respectively, reverse) drive mode in which the motor 2 is driven in movement in the direction of displacement S1, respectively S2, which corresponds to the direction of displacement to which said transition mode will have (progressively) given preponderance.

More generally, according to a preferred feature which may constitute an invention on its own, it is therefore possible to consider that the control module 10 comprises a (fourth) activation mode called <<transition mode>> according to which said control module 10 energizes the propulsive winding circuit 4 (or if appropriate the concerned propulsive winding circuits 4) by means of an alternating supply voltage $U_{supply}$ (that is to say the polarity of which is periodically inverted, according to a chosen heating frequency $F_H$) which has a duty-cycle, called <<inversion duty-cycle>> $\alpha_{inv}$, strictly comprised between 0% and 50%, or respectively strictly comprised between 50% and 100%, that is to say not strictly equal to 50% as in the heating oscillating mode, so as to give preponderance to a direction of displacement (herein S2 by opting for $\alpha_{inv}$ belonging to the range]0%-50%[) relative to the other direction of displacement (herein S1 which corresponds to the range]50%-100%[), and thus combine warming-up the propulsive winding circuit 4 with a progressively setting the electric motor 2 in drift movement in the direction of displacement S2, respectively S1, to which said inversion duty-cycle $\alpha_{inv}$ gives preponderance.

According to a possible implementation of such a transition mode, called <<dynamic transition mode>>, it is possible to gradually increase, over time and as the fluid is thawing, the preponderance of the chosen direction of displacement S1, respectively S2, that is to say progressively and continuously make the inversion duty-cycle $\alpha_{inv}$ vary so as to smoothly switch from a <<pure>> heating oscillating mode to a <<pure>> non-oscillating drive mode.

Thus, it is possible to make the inversion duty-cycle $\alpha_{inv}$ progressively change from 50% (equilibrium situation in a fixed position, in accordance with the heating oscillating mode) up to 100% (drive in the direction S1, in accordance with the direct drive mode), by continuously and progressively increasing said inversion duty-cycle $\alpha_{inv}$ over time, for example by successive increasing steps or following a ramp increasing as a function of time, in order to pilot the smooth transition from the heating oscillating mode toward the direct drive mode.

Conversely, it is possible to make the inversion duty-cycle $\alpha_{inv}$ switch progressively from 50% (equilibrium situation in a fixed position, in accordance with the heating oscillating mode) down to 0% (drive in the direction S2, in accordance with the reverse drive mode), by continuously and progressively decreasing said inversion duty-cycle $\alpha_{inv}$ over time, for example by successive decreasing steps or following a ramp decreasing as a function of time, in order to pilot a smooth transition from the heating oscillating mode toward the reverse drive mode.

Advantageously, by using such a transition mode with dynamic adaptation of the chopping duty-cycle $\alpha_{inv}$, it is possible to progressively set the motor 2 in movement, while preserving an effective heating action which allows finishing thawing of the fluid circuit 100, and/or maintaining said fluid circuit 100 in the thawed state.

The control module 10, as well as its various constituents, may be realized by any appropriate electronic circuit, of the computer or logic controller type.

Moreover, it will be noted that the heating oscillating mode, or if appropriate the transition mode, may advantageously be automatically activated when the temperature of the motor 2, the temperature of the mechanism 3, the temperature of the environment of the device 1, or the temperature of the fluid 20, measured by a suitable temperature sensor, falls below a predetermined critical threshold, for example slightly higher than the solidification temperature of the fluid 20.

More generally, the selection of the appropriate activation mode (direct drive, reverse drive, or oscillating heating, or even transition) may be automatically decided by the control module 10, on the one hand, depending on the measured temperature (as indicated hereinabove) and, on the other hand, depending one or several order(s) (typically at least one pumping order) coming from the user of the device 1 (or more generally coming from the user of the system 50 which integrates the motor 2 and the heating device 1) or coming from an adjacent system (for example an on-board computer of a vehicle), as illustrated in FIG. 4.

Thus, for example, if the control module 10 receives a pumping order, the measured temperature will be checked, and the direct drive mode will be afterwards selected if said measured temperature guarantees that the fluid is actually in the liquid state.

If, in contrast, the measured temperature indicates a possible freezing of the fluid, and therefore a possible blocking of the motor 2, the control module 10 will automatically delay the execution of the pumping order, and will first apply the heating oscillating mode, until the measured temperature reaches and exceeds a temperature threshold sufficiently high to guarantee thawing of the fluid 20 and unblocking of the rotor 6.

Of course, it is possible to use, rather than a temperature measurement, other adequate means to determine whether the motor 2, and more generally the system 50 or the fluid circuit 100 is blocked by frost, for example by measuring the response electric current of the motor during the application of the supply voltage, in order to detect the rapid occurrence of a high current, higher than a warning threshold, and characteristic of a blocked rotor.

The control module 10 can also automatically manage the chopping duty-cycle $\alpha_{PWM}$ serving to fix the average value of the supply voltage $U_{supply}$ by chopping the nominal voltage $U_0$.

Thus, the control module 10 may modify, if necessary, said chopping duty-cycle $\alpha_{PWM}$, and therefore the average value (effective value) of the supply voltage $U_{supply}$, over time, for example in order to ensure a progressive starting of the motor 2 in the drive mode.

Similarly, in absolute terms, the control module 10 may be used, if necessary, to modify the chopping duty-cycle $\alpha_{PWM}$, and therefore the average value (RMS value) of the supply voltage $U_{supply}$, over time, in the heating oscillating mode, in order to use said supply voltage average value as a means for regulating the winding current I4, at a given heating frequency $F_H$.

More particularly, it is thus possible to make the chopping duty-cycle $\alpha_{PWM}$, and therefore the average value of the supply voltage $U_{supply}$, vary so as to maintain the peak magnitude value I4_peak of the (alternating) winding current I4 in the range of aforementioned acceptable values: [I4_peak_min; I4_peak_max], that is to say to control the peak magnitude I4_peak, in order in particular not to cause a movement of the motor 2 during heating.

According to a possibility which is alternative or complementary to the previous one, it is possible to consider making said average value of the supply voltage vary so as to maintain the RMS value I4_eff of the (alternating) winding current I4 comprised between a predetermined minimum RMS value I4_eff_min, necessary to the warm-up of the winding circuit 4, and a predetermined maximum RMS value I4_eff_max, thereby avoiding an overheating of the winding circuit 4 or a movement of the motor, that is to say so as to control the RMS value I4_eff of the winding current.

Similarly, if the heating frequency $F_H$ is adjustable, the automatic setting of said heating frequency may be assigned the control module 10.

As such, the control module 10 may in particular, in the heating oscillating mode, make the heating frequency $F_H$ vary so as to regulate the peak magnitude I4_peak and/or the RMS value I4_eff of the winding current I4, so that said peak magnitude I4_peak is maintained in the range of aforementioned acceptable values [I4_peak_min; I4_peak_max], and/or (alternatively, or preferably cumulatively) so that the RMS value I4_eff of the current which actually passes through the winding circuit 4 remains comprised between a minimum RMS value I4_eff_min, necessary to the warm-up of the winding circuit 4, and a maximum RMS value I4_eff_max avoiding an overheating and/or an unintentional movement of the motor 2.

In other words, the control module will be preferably capable of automatically adjusting, in the heating oscillating mode (or if appropriate in the transition mode), the heating frequency $F_H$ so as to regulate the winding current I4, in particular in order to control the peak magnitude I4_peak of said winding current I4 according to peak magnitude setpoint I4_peak_set and/or to control the RMS value I4_eff of the winding current I4 according to an RMS value sepoint I4_eff_set.

It will be noted that controlling the winding current I4 by the heating frequency $F_H$ will be preferred to controlling said winding current I4 by the supply voltage, because it is particularly simple to dynamically adjust the heating frequency $F_H$, by dynamically adjusting the frequency of the selection signal Select which pilots the cyclic permutation of the switching circuit 12.

Preferably, in the heating oscillating mode, the regulation of the supply voltage by the chopping duty-cycle $\alpha_{PWM}$ may serve to maintain a constant average supply voltage $U_{supply}$, which may for example correspond to the nominal voltage of the motor 2.

According to another possible variant, the control module 1 can, in particular in the heating oscillating mode or the transition mode, simultaneously adjust each of the voltage and frequency parameters, that is to say dynamically adjust on the one hand the chopping duty-cycle $\alpha_{PWM}$ that produces the average supply voltage and, on the other hand, the heating frequency $F_H$, so as to control the current I4 that passes through the winding circuit 4 in accordance with a peak magnitude setpoint I4_peak_set and/or (alternatively, or preferably cumulatively) in accordance with an RMS value setpoint I4_eff_set.

As illustrated in FIG. 1, the heat generated inside the motor 2 by the activation of the propulsive winding circuit 4 in accordance with the heating oscillating mode will be progressively transmitted, in particular by conduction, to the members adjacent to the motor 2.

Thus, different heat flows will be observed, coming from the inside of the motor 2, among which a first heat flow Q14 which is conveyed through the (rigid and fixed) frame 14 of the motor 2, and a second flow Q15 which is conveyed through the shaft 15 of the motor (wherein said shaft forms an extension of the rotor 6).

Hence, the invention aims to promote and direct these heat flows Q14, Q15 so as to optimize the heating speed of the frozen fluid 20.

Indeed, as example, within an urea circuit intended for the depollution of the exhaust gases, the fluid circuit must be made operational in less than twenty minutes (1200 seconds), that is to say that, in practice, the activation of the heating oscillating mode must allow bringing the aqueous urea solution contained in the body of the pump 3, coupled to the electric motor 2, from a −15° C. temperature to a temperature higher than −11.5° C. (melting temperature) in this time frame.

Yet, the inventors have further observed that, in a manner known per se, the electric motor 2 may include, around its stator 5, that is to say at the frame 14, a magnetic flux collecting envelope 16, substantially annular, made of a metallic material such as soft iron.

Such a magnetic flux collecting envelope 16 allows channeling the propulsive magnetic field of the motor 2 and closing said propulsive magnetic field on itself, in order to optimize the flux of said magnetic field.

Herein, the inventors have then considered that said magnetic flux collecting envelope 16 could preferably include, as illustrated in FIGS. 3 and 4, an extension 17, integrally formed with said envelope 16, said extension 17 extending beyond the stator 5 up to a predetermined target-area 18, for example the body of the pump 3 actuated by the motor 2, so as to promote the collection of heat coming from the motor 2 and the transfer, by conduction, of said heat up to said target-area 18.

In other words, the inventors propose modifying the arrangement of the magnetic flux collecting envelope 16, that is already present on the motor 2 to ensure a first magnetic flux guide function, so as to confer to said envelope 16 a second heat conduction function, optimized according to the heating need.

Ad such, it will be noted that the extension 17, which preferably forms a tab which extends substantially parallel to the axis of the shaft 15 of the motor 2, projecting axially beyond the frame 14 of the motor, advantageously penetrates into the space occupied by the body of the pump 3, and comes into contact with said body of the pump 3, the closest to the fluid to thaw.

Of course, the invention also encompasses a fluid circuit 100 which comprises a heating device 1 according to either one of the variants described in the foregoing, intended to ensure the heating of a fluid 20 conveyed by said fluid circuit 100, and the electric motor 2 of which is intended to drive a pump 3 ensuring the pumping of said fluid 20 within said fluid circuit 100.

Said fluid circuit 100 will be intended to be exposed to an environment the temperature of which may vary over a predictable range of operating temperatures (for example from −40° C. to +85° C.) which extends at least partially below the solidification temperature of said fluid 20 (wherein said solidification temperature is typically comprised between −40° C. and −12° C.).

Consequently, the propulsive winding circuit 4 of the motor 2, as well as the heating oscillating mode managed by the control module 10, will be configured and sized so as to allow ensuring the thawing of the fluid present in the body of the pump 3, over the entirety of said range of predictable operating temperatures, in a predetermined maximum duration (typically 1200 seconds).

In a particularly preferred manner, the fluid circuit 100 may be devoid of other auxiliary heating elements, the winding circuit 4 alone being sufficient to ensure the function of heating and thawing the fluid.

Preferably, the fluid circuit 100 may form an urea circuit intended for the depollution of the exhaust gases of an engine, in particular a vehicle engine, a windshield washer circuit intended for the cleaning of glass surfaces (windshield, headlights optics, rear-view mirrors, etc.) of a vehicle, a cooling circuit using an aqueous solution as a heat-transfer fluid, or a circuit supplying fuel to an engine of the vehicle (typically a combustion engine ensuring the propulsion of said vehicle).

The invention also concerns a vehicle, in particular a motor vehicle, such as a wheel-driven land vehicle, intended for example for people transportation, which is equipped with an embedded fluid circuit 100 according to the invention.

Finally, the invention concerns a heating method involving a step of powering with alternating voltage a winding circuit of a direct-current motor, according to either one of the features described in the foregoing.

As such, the invention concerns in particular the use, as a heating element (allowing heating a body 20, such as a fluid 20 contained in a fluid circuit 100), of a propulsive winding circuit 4 belonging to a direct-current electric motor 2, said propulsive winding circuit 4 being arranged to be normally powered by a direct supply voltage $U_{supply}$ which has a chosen polarity, positive or on the contrary negative, and which allows said winding circuit 4 to move said motor 2 in a direction of displacement S1, S2 defined by the polarity of said supply voltage $U_{supply}$, the warm-up of said propulsive winding circuit 4 being obtained, substantially without setting the motor 2 in movement, by applying (intentionally) to said propulsive winding circuit 4 an alternating supply voltage $U_{supply}$ with a predetermined frequency, called <<heating frequency>> $F_H$, which oscillates between a positive polarity and a negative polarity.

More particularly, the invention concerns as such the use of a rotor winding circuit 4 of a motor 2 with brushes 7 as a resistive heating element, by application of an alternating supply voltage $U_{supply}$ at the terminals 4A, 4B of said winding circuit 4.

Of course, the invention is in no way limited to the sole variants described in the foregoing, those skilled in the art being in particular capable of freely isolating or combining together either one of the aforementioned features, or substituting them with equivalents.

The invention claimed is:

1. A heating device intended to heat a body, such as a fluid contained in a fluid circuit, said heating device comprising:
    at least one electric heating element; and
    at least one control module comprising an electronic circuit arranged to electrically power said heating element so that said heating element produces heat to heat the body,
    wherein said heating element is formed by a propulsive winding circuit of a direct-current electric motor which, when it is electrically powered by an appropriate direct supply voltage ($U_{supply}$), having a given polarity, generates a drive force which tends to drive the motor in a direction of displacement which is determined by the polarity of said supply voltage ($U_{supply}$), and
    wherein the control module comprises an activation mode, which is referred to as a heating oscillating mode, according to which said control module causes the warm-up of the propulsive winding circuit by applying at the terminals of said winding circuit an alternating supply voltage ($U_{supply}$) whose polarity switches, alternately and automatically, according to a predetermined frequency, which is referred to as a heating frequency ($F_H$), from a first polarity to an opposite second polarity.

2. The device according to claim 1,
    wherein the control module is arranged to selectively adopt an activation mode among a plurality of available activation modes comprising, on the one hand, the heating oscillating mode, according to which said control module applies at the terminals of the propulsive winding circuit an alternating supply voltage ($U_{supply}$) at the heating frequency ($F_H$) and, on the other hand, at least one other activation mode, which is referred to as a drive mode, according to which said control module applies, at the terminals of the propulsive winding circuit, a direct supply voltage ($U_{supply}$), with a constant polarity, so as to drive the motor in a direction of displacement corresponding to said polarity.

3. The device according to claim 1,
wherein the control module comprises a switching circuit intended to connect the terminals of the propulsive winding circuit to a voltage source, said switching circuit being arranged to allow selectively adopting, on the one hand, a first connection configuration, in which said switching circuit ensures the application at the terminals of the propulsive winding circuit of a direct supply voltage having a first constant polarity, in accordance with a first activation mode, which is referred to as a direct drive mode, and which allows driving the motor in a first direction of displacement and, on the other hand, a second connection configuration, in which this same switching circuit ensures the application at the terminals of the propulsive winding circuit of a direct supply voltage having a second constant polarity, inverted with respect to the first polarity, in accordance with a second activation mode, which is referred to as a reverse drive mode, and which allows driving the motor in a second direction of displacement opposite to the first direction of displacement, and
wherein, in order to implement the heating oscillating mode, in accordance with a third activation mode, said switching circuit alternately switches, at the predetermined heating frequency, from its first connection configuration to its second connection configuration and then vice versa.

4. The device according to claim 3,
wherein the switching circuit is formed by an H-bridge, connected to a direct voltage source.

5. The device according to claim 3,
wherein the control module comprises a selector which selects the connection configuration of the switching circuit according to the value assumed by a binary input signal, which is referred to as a selection signal, and which may selectively assume a first value associated to the first connection configuration, and therefore to the first direction of displacement of the motor, or a second value distinct from the first value and associated to the second connection configuration, and therefore to the second direction of displacement,
wherein the direct drive mode is activated by placing the selection signal at its first value, whereas the reverse drive mode is activated by placing the selection signal at its second value, and
wherein the heating oscillating mode is activated by using an alternating selection signal, which periodically alternates, in accordance with the chosen heating frequency, between the first value and the second value and vice versa.

6. The device according to claim 1,
wherein the heating frequency is comprised between 50 Hz and 100 kHz.

7. The device according to claim 1,
wherein the direct-current electric motor is a rotary motor with brushes, and
wherein the propulsive winding circuit to which the control module applies the supply voltage is a rotor winding of said motor, powered via said brushes.

8. The device according to claim 1,
wherein the control module automatically adjusts the heating frequency so as to regulate the electric current, which is referred to as a winding current, and which passes through the winding circuit.

9. The device according to claim 1,
wherein the control module comprises an activation mode, which is referred to as a transition mode, according to which said control module energizes the propulsive winding circuit by means of an alternating supply voltage which has a duty-cycle, which is referred to as an inversion duty-cycle, strictly comprised between 0% and 50%, or respectively strictly comprised between 50% and 100%, so as to give preponderance to a direction of displacement rather than the other direction of displacement, and thus combine warming-up the propulsive winding circuit with progressively setting the electric motor in drift movement in the direction of displacement to which said inversion duty-cycle gives preponderance.

10. The device according to claim 1,
wherein the electric motor includes, around a stator of the electric motor, a magnetic flux collecting envelope, substantially annular, made of a metallic material such as soft iron, and
wherein said magnetic flux collecting envelope includes an extension, integrally formed with said envelope, and which extends beyond the stator up to a predetermined target-area, so as to promote the collection of heat coming from the motor and then the transfer, by conduction, of said heat up to said target-area.

11. A fluid circuit comprising:
a heating device according to claim 1 intended to ensure the heating of a fluid conveyed by said fluid circuit,
wherein the electric motor of said the heating device is intended to drive a pump ensuring the pumping of said fluid within said fluid circuit.

12. A vehicle equipped with an embedded fluid circuit according to claim 11,
wherein said fluid circuit forms an urea circuit intended for the depollution of the exhaust gases of a vehicle, a windshield washer circuit intended for the cleaning of glass surfaces of a vehicle, a cooling circuit using an aqueous solution as a heat-transfer fluid, or a circuit for supplying fuel to an engine of the vehicle.

* * * * *